March 5, 1935.    B. R. BROWN    1,993,590
SERVING DISH AND HANDLE THEREFOR
Filed June 2, 1933
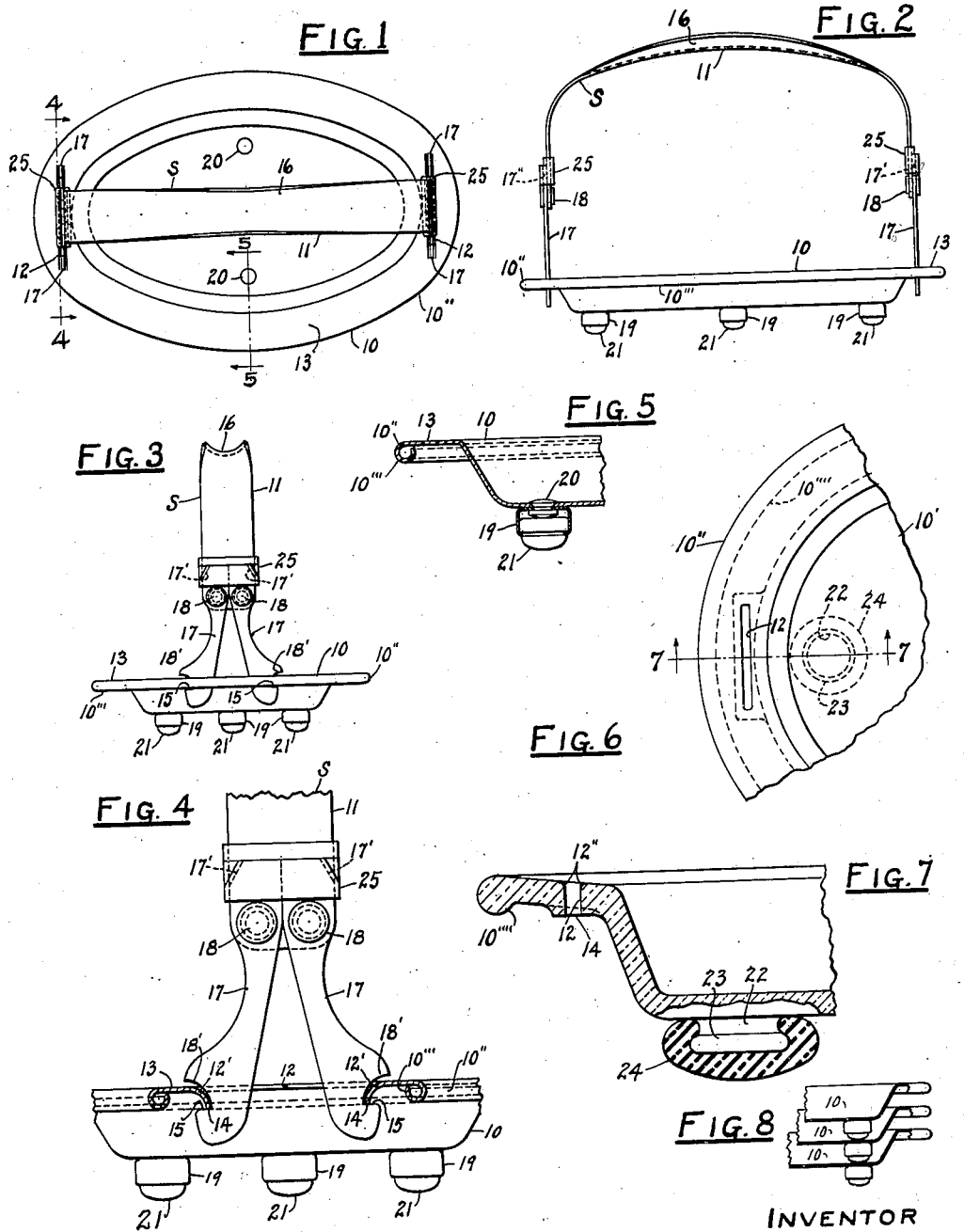
INVENTOR
Bernard R. Brown
BY Wm G. Blomstran.
HIS ATTORNEY Patented Mar. 5, 1935

1,993,590

UNITED STATES PATENT OFFICE 1,993,590

SERVING DISH AND HANDLE THEREFOR

Bernard R. Brown, Maywood, Ill.

Application June 2, 1933, Serial No. 674,028

5 Claims. (Cl. 65—15)

The invention relates in general to various kinds of dishes which may be used for serving purposes at the dining table, but more particularly it has reference to serving dishes such as platters, and deep bowl dishes in which are being served potatoes, salads, etc., in large quantities. It has further reference to such class of dishes which are adapted to receive a detachable handle or bail. It has further reference to handles or bails which may be detachably attached to such platter, bowl, or dish as the case may be, the dish being hot and containing hot food, whereby the same may be readily passed around the table from one person to another without there being the least danger of the person burning him or herself and causing other damages.

The invention further contemplates the provision of insulating a hot dish, such as it may be, in such a manner that the heat therefrom, even though it be placed on a bare table, will not affect or scorch the varnish or finish of the table.

The invention further contemplates dishes having the above stated characteristics which provide neatness of design, yet durable, and which may be readily manufactured at a comparatively small cost, and which, being of like kind and size, may be stacked one upon the other.

These and other objects of the invention will be better understood by referring to the several illustrations of the accompanying drawing, and more fully described in the following specification, and more particularly pointed out in the appended claims.

In the drawing, Figure 1 is a plan view of a dish and handle or bail embodying the improvements contemplated in the invention. The dish being represented in this instance, is a platter as may be formed from metal.

Figure 2 is a side view of Figure 1;

Figure 3 is an end view of Figure 1;

Figure 4 is a sectional view, on a larger scale, taken on line 4—4, of Figure 1;

Figure 5 is a sectional view, on a larger scale, taken on line 5—5, of Figure 1;

Figure 6 is a plan view of a fragmentary portion of a dish being formed from porcelain, or the like;

Figure 7 is a sectional view, on a larger scale, taken on line 7—7, of Figure 6; and, Figure 8 is a sectional view showing portions of dishes stacked one upon the other.

In the drawing similar characters refer to similar parts throughout the several views.

To illustrate the invention, I have shown as an example, a shallow dish or platter 10, with its carrying handle or bail 11, attached thereto, the dish being reinforced around its outer rim or edge 10'', by an underturned flange 10''' or a bead 10''''. The handle being disengageably attached to dish 10, through parallel elongated slots 12, being formed in rim or flange 13, at, preferably, diametrically opposite ends of the dish. In the slots are formed opposite engagement edges 14, to which notches 15, in handle members 17, are adapted to engage on lifting the dish or plate 10, by the handle 11. The opposite ends, and, as well, the opposite top edges of slots 12, are formed so as to have a rounded contour, respectively, 12', and 12'', which will permit of easy insertion of members 17.

Handle 11, being comparatively simple and neat in construction, comprises, a hand grip portion 16, having a pair of hinged engagement members 17, hingeably secured by shouldered hinge pins 18, being, preferably, riveted into each of the ends of portion 16, of the handle, as is shown in Figures 1, 2, and 3.

In order to prevent members 17, from being inserted through slots 12, any more than is necessary to permit notches 15, to become engaged with edges 14, the members have stops 18', formed therein a suitable distance up from notches 15. The grip portion 16, of the handle is, preferably, formed from a narrow flat strip of metal S. The strip being, preferably, formed into the shape of an arch as is shown in Figure 2, and the grip portion 16, curved, in the manner shown in Figure 3, so as to present a curved surface to the hand taking hold of same to lift the dish on which it may have been installed. Said stops 18', being adapted to prevent the dish or plate from tipping over should food be unevenly distributed on the dish whereby to cause an unbalanced condition.

Referring to sectional view, Figure 5, it will be seen that dish 10, is provided with a short hollow leg or foot 19, riveted in place by a rivet 20. Inserted in foot 19, is an insulating shoe or cushion 21. There being, in this instance, four of such devices suitably distributed symmetrically on the underside of the dish whereby to elevate the dish a suitable distance above the surface of a table so that the heat from such dish will not cause any damage to the finish on the surface of the table on which the dish may be set.

In the view, Figure 7, it will be seen that dish 10', has a downwardly extending leg or foot 22, formed thereon with a rim or rounded annular bead 23, formed at its lower end. Over the foot 22, is fitted an insulating shoe or cushion 24. The foot and shoe, respectively, 22 and 24, as those provided on dish 10, elevate the dish, as before stated, sufficiently above the table so as not to cause any damage to the surface of a table should the dish be hot when the same is set on the table.

The insulating shoes or cushions, either 21, or 24, may be made of any suitable soft or pliable material as, for instance, gum rubber. But shoes 21, could be readily made from cork.

In order to prevent members 17, from accidentally collapsing while carrying a dish full of hot food, or at any other time, a lock sleeve 25, is provided to slideably fit over each end of handle portion 16, and ends 17', of members 17. The sleeves 25, being arranged over ends 17', as is shown in Figures 2 and 3, engage the ends 17', and hold them together and thereby hold the notched end of each of members 17, from being disengaged from their place of engagement with edges 14, of the dish. On desiring to disengage the handle from the dish, it will only be necessary to slide the sleeves up free of the ends of 17', whereby the members 17, will, due to the action of gravity, automatically disengage from the edges 14, whence they may be removed from the slot of the dish.

The lower ends of 17, being together when sleeve 25, is free and above ends 17', may be readily inserted into slots 12, until the shoulders, or stops 18, rest against the top of the dish. The ends 17', being formed in a suitable manner, that is to say, so that, when sleeves 25, are being lowered to lock member 17, in place, they will engage the upper lateral edges 17'', of ends 17', and operate members 17, so that notches 15, therein will move toward and engage edges 14, of the dish, whereby the dish may be lifted and carried about.

Having thus described the invention, it may be readily understood that the minor details of its construction may be altered in several ways without departing from the spirit and scope of the invention, and without losing any of its attendant advantages. Therefore, what is claimed is desired to be secured by Letters Patent.

I claim:

1. In combination, a dish and a handle therefor, the dish having opposite parallel slots suitably formed therein, and the handle or bail having hinged members depending therefrom and having slideable sleeves mounted thereon arranged in co-operative relation to said members, the said members being adapted to be inserted through the said slots and be lockingly engaged to said dish by means of said sleeves, and means, comprising cushioned feet or legs, to elevate the bottom of the dish clear of the top of a table and insulate one from the other.

2. In combination, a dish and a handle therefor, the dish having opposite parallel slots suitably formed therein, the handle or bail having plate or dish engaging members hingeably secured to its ends, the said members being adapted to be inserted through said slots, said handle carrying slideable sleeves arranged in co-operative relation to said members, and, said sleeves being adapted to be moved over said members and urge said members in releasably locked engagement with said dish through the said slots.

3. In combination, a dish and a handle therefor, the handle or bail having dish engaging members hingeably secured to the ends thereof, and the dish having opposite parallel slots suitably formed therein in which to receive, detachably, the said members, the said members having dish engagement notches and means to prevent an unevenly loaded dish from tipping over while the same is being carried thereby, locking sleeves slideably mounted over the handle in co-operative relation to said members, and the said sleeves being adapted to be moved over said members and urge the members to locking engagement to said dish through the said slots, and, the said members being self releasing on the removal of said sleeve therefrom.

4. In combination, a dish and a handle therefor, the dish being reinforced around its outer edge by an underturned flange and having a pair of opposite parallel slots suitably formed therein, the handle or bail having hinged members mounted thereon at its ends, the said members being adapted to be inserted through the said slots and be detachably secured therein, slideable sleeves mounted over said handle adapted to slideably engage said members and secure the same in locked position in said slots, and cushioned legs or feet secured to the underside of said dish or plate.

5. In combination, a dish and handle therefor, the dish being reinforced around its outer edge by an underturned bead and having a pair of opposite parallel slots formed therein, a pair of hinged members secured at the opposite ends of said handle, the said members being adapted to be inserted through said slots and lockingly engage said dish, sleeves slideably mounted on said handle in co-operative relation to said members, said sleeves being adapted to be moved over said members and urge the same in locked position in said slots, and cushioned feet or legs disposed on the underside of said dish for supporting the same a suitable distance above the surface of a table.

BERNARD R. BROWN.